Nov. 29, 1966   J. A. NYDAM   3,288,497
COLLAR CONNECTOR
Filed Jan. 31, 1964

INVENTOR.
JAMES A. NYDAM
BY
Price & Heneveld
ATTORNEYS

United States Patent Office
3,288,497
Patented Nov. 29, 1966

1

3,288,497
COLLAR CONNECTOR
James A. Nydam, Grand Rapids, Mich., assignor of one-half to Clarence J. Brashler, Grand Rapids, Mich.
Filed Jan. 31, 1964, Ser. No. 341,695
2 Claims. (Cl. 285—138)

This invention relates to a collar connector between sections of conduit, and more particularly relates to a removable gripping connector especially advantageous for attaching a flexible hose to a conduit such as an exhaust pipe of a motor vehicle.

This invention was developed for use with engines and therefore will for convenience be explained with respect thereto. However, in the broader aspects of this invention, it can be used for other types of conduits as will be understood.

Proper mechanical repair of a vehicle engine normally requires simultaneous or subsequent operation of the engine in the repair garage. To vent the noxious poisonous fumes from the engine to the outside of the garage, a flexible hose is presently attached to the exhaust pipe by slipping one end of the hose over the exhaust pipe and extending the hose outdoors either beneath the garage door or through an overhead system. The slip-over collar, usually of rubber, on the end of the hose becomes rapidly deteriorated at the high temperatures of the exhaust pipe. Also, mechanics tend to give these rubber collars very rough treatment in attaching and removing them from the exhaust pipe, causing severe damage to them in a relatively short period of time. Consequently, these must be replaced fairly often if the system is to perform its intended purpose. Obviously a faulty connection cannot be tolerated, since only a tiny percentage of carbon monoxide in the building would be lethal. These factors of short hose life and undependability present a considerable problem, especially to large operations. But, they have existed for a long time, and therefore are tolerated by frequent replacement of units.

These hoses and collars create an expense, not only because of frequent replacement, but also because each one is only capable of fitting one particular size of pipe. Therefore, an inventory of them is normally necessary to suit various size exhaust pipes on automobiles and trucks, as well as other uses.

It is an object of this invention to provide a novel connector for conduits, enabling the same connector to be employed for practically an unlimited amount of time, even with frequent attachment to and removal from a conduit.

It is another object of this invention to provide an attachable connector relatively unaffected by heat so as not to deteriorate under high temperatures, and yet which tightly resiliently grips the exhaust pipe to which it is attached.

It is another object of this invention to provide a conduit connector that can receive varying diameter and variously shaped conduits in tightly gripping relationship. It is therefore useful for various size exhaust pipes found on automobiles and trucks. Yet, the unit is extremely simple to attach merely with a simple push, in spite of this versatility. It is also readily removed with a simple pull.

It is another object of this invention to provide a metallic, removable conduit connector that can be formed from inexpensive materials and requires only a few forming operations. Even though the connector is highly adaptable to different uses and sizes of conduits, it is effective in its gripping relationship to the conduit, is easily installed and removed for effective gaseous conductance, and has an almost unlimited life period in spite of rough usage and high temperature surroundings.

2

These and several other objects of this invention will become apparent upon the studying of the following specification in conjunction with the drawings in which.

Figure 1:
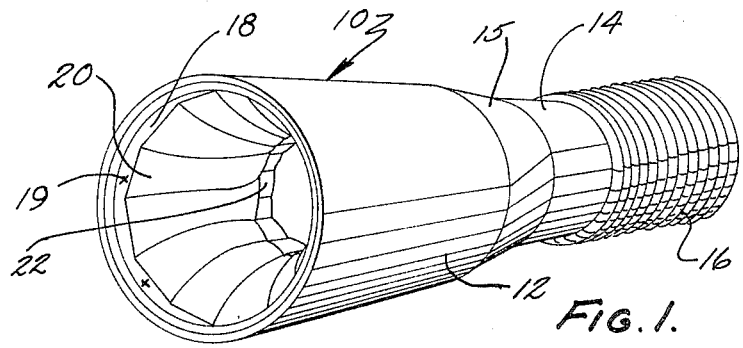
FIG. 1 is a perspective view of the novel connector shown with a sectional flexible hose attached to the downstream end.
Figure 3:
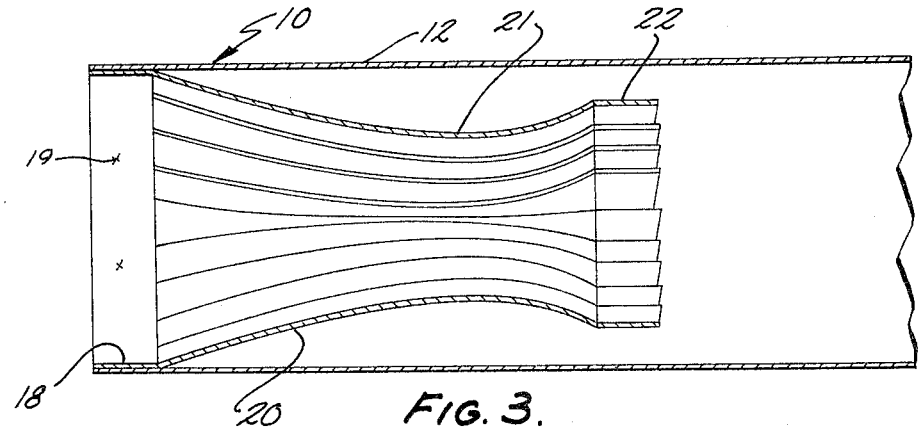
FIG. 3 is a sectional fragmentary view of the connector.

Referring specifically to the drawings, the novel connector 10 is shown with a flexible hose 16 attached to the downstream end. The housing includes an elongated, generally cylindrical sheet metal sleeve 12, which preferably has a necked-down smaller diameter downstream end 14 with an intermediate tapered zone 15.

Figure 4:
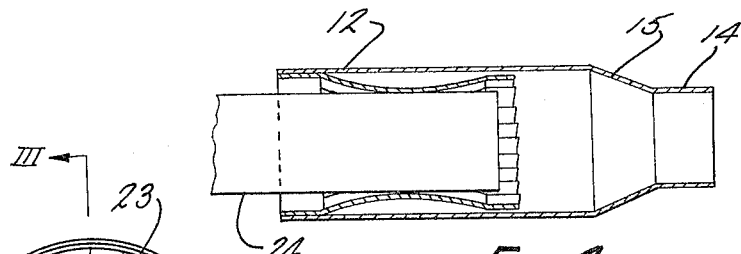
FIG. 4 is a sectional view of the connector shown attached to a conduit.
Figure 2:
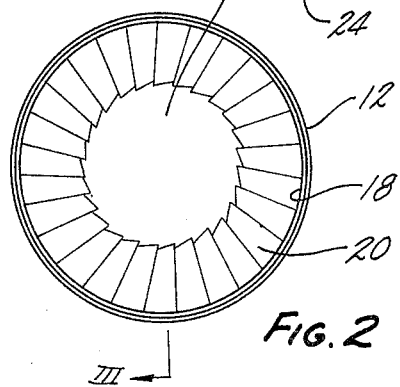
FIG. 2 is an end view of the novel connector.

Within this sleeve is an axially oriented, expandable, connecting and sealing iris formed by a plurality of elongated, spring-metal strips or fingers 20. These strips are integrally joined together at one end into a continuous annulus 18. This annulus has a diameter the same as the internal diameter of sleeve 12, and is affixedly secured thereto as by spot welding at selected points 19 around its periphery. The elongated metallic strips extend generally axially of the tubular surrounding sleeve, but converge radially inwardly toward each other into an overlapping relationship forming a spiral. The smallest diameter portion of the iris 21 is formed by convexities intermediate the ends of the strips. These portions form the radially inmost parts of the fingers. The rearward or downstream ends 22 of the strips are formed with a diverging relationship with respect to each other for ease of attachment to a conduit. This enables the iris to be expanded by contact with the end of the conduit. The central portion 21 provides an extremely effective contact area with the inserted conduit 24 (FIG. 4).

The metallic strips are formed and configurated to assure overlapping relationship, even when the iris opening is expanded radially outwardly by the insertion of a conduit. This assures optimum gripping relationship, and also effective gaseous sealing for gases flowing rearwardly through the conduit. Extensive testing of the unit shows that the gaseous leakage is so small as to be not measurable. The fingers or strips must have substantial resilience to be biased tightly into their contracted relationship when expanded radially outwardly. The fingers are also axially within the confines of the ends of the outer sleeve.

Use has shown that the novel connector can be removed and replaced any number of times, even with rough handling, yet have an exceptionally long life. In fact, the life period of the unit has not been successfully established, since none shows any significant wear even after a long period of time.

To place the connector on an exhaust pipe 24, or a similar gaseous conduit from any appliance, as well as any engine, or on a material handling conduit, the connector is merely slid over the conduit with a simple axial push. The axial force causes the conduit to press against the diagonally tapered convergent fingers, to expand the iris radially outwardly, while keeping the central smaller diameter portions of the fingers in firm gripping relationship with the periphery of the conduit.

Normally, in its use on an engine, a flexible conduit 16 is connected on the smaller diameter end 14 of the sleeve for outflow of gases. This connection between the flexible hose and connector is not removed under normal circumstances. Rather, the connector is merely slid onto and off of the exhaust pipe when the automobile engine is operated. High temperatures normally encountered with exhaust pipes have practically no effect on it at all. Consequently, it will be readily appreciated that all of the advantages of the prior type units are present, and none of the disadvantages.

It is conceivable that certain minor structural modifications could be made in the particular preferred form of the device illustrated without departing from the inventive concept set forth herein. For example, in the broader aspects of the invention, the element, including the fingers, could be made of other materials including flexible, resilient, polymers such as nylon or Teflon, or polymeric coated metal, or fiber glass reinforced materials. Also the finger configuration could conceivably be modified somewhat. These materials could be employed, for example, when conveying gaseous-suspended particulate matter. Therefore, this invention is not to be limited specifically to the illustrated details of the preferred structure, but only by the scope of the appended claims and the reasonably equivalent structures to those defined therein.

I claim:

1. A removable gas conduit connector comprising: an elongated, hollow sleeve; an expandable annular connecting and sealing iris in said sleeve; said iris being formed of a plurality of axially elongated strips joined on one end into an annulus; said annulus being sealingly affixed to the inner peripheral wall of said hollow sleeve adjacent one end of said sleeve; said strips being convergent together in a radially inward tapered manner, into an overlapping spiraled relationship from said annulus, and being divergent at the ends opposite said annulus; each strip engaging in substantially a fluid tight manner the adjacent strip for substantially its entire axial length; said convergent overlapping strips forming a central annular opening therebetween; said strips being expandable toward said sleeve against their inherent bias, whereby a gas conduit inserted axially into said sleeve expands said iris to form a fluid tight connection therewith.

2. An exhaust pipe connector comprising: an elongated tubular metallic outer sleeve with a first open end to internally receive an exhaust pipe, and a second open end to interfit with a flexible conduit; a plurality of spring metal strips extending generally axially inside of said sleeve; said strips being integrally joined together on one end into an annular portion; said annular portion being sealingly secured to the internal peripheral surface of said sleeve at one end of said sleeve; said strips being convergent toward the central portion of said sleeve into an overlapping spiraled relationship to form an iris, and being divergent toward their opposite ends; each strip engaging in substantially a fluid tight manner the adjacent strip for substantially its entire axial length; said iris being radially expandable with the axial insertion of an exhaust pipe, against the bias of said metallic strips, with said strips forming a tight gripping and sealing connection on said pipe at said convergent area.

References Cited by the Examiner

UNITED STATES PATENTS

| 1,528,560 | 3/1925 | Myers et al. | 285—138 X |
| 1,817,776 | 8/1931 | Sipe | 285—340 |
| 2,090,719 | 8/1937 | Alt | 285—107 |
| 3,112,790 | 12/1963 | Matthiessen | 285—45 |
| 3,150,887 | 9/1964 | Simmons | 285—345 X |

FOREIGN PATENTS

| 1,280,762 | 11/1961 | France. |
| 123,630 | 12/1948 | Sweden. |

CARL W. TOMLIN, *Primary Examiner.*

D. W. AROLA, *Assistant Examiner.*